US011199823B2

(12) United States Patent
Morley et al.

(10) Patent No.: US 11,199,823 B2
(45) Date of Patent: Dec. 14, 2021

(54) MODULAR ROOM CONTROL INTERFACE AND SENSORS

(71) Applicant: Schneider Electric Buildings LLC, Rockford, IL (US)

(72) Inventors: Michael Morley, Deerfield, NH (US); Babak Haghayeghi, Belmont, MA (US); Simon Lemaire, Plaistow, NH (US)

(73) Assignee: Schneider Electric Buildings, LLC, Rockford, IL (US)

( * ) Notice: Subject to any disclaimer, the term of this patent is extended or adjusted under 35 U.S.C. 154(b) by 464 days.

(21) Appl. No.: 15/852,233

(22) Filed: Dec. 22, 2017

(65) Prior Publication Data
US 2019/0196432 A1    Jun. 27, 2019

(51) Int. Cl.
*G05B 15/02*     (2006.01)
*G05B 19/042*    (2006.01)
*H04L 12/28*     (2006.01)
*H05B 47/19*     (2020.01)
*H05B 47/115*    (2020.01)

(52) U.S. Cl.
CPC ......... *G05B 15/02* (2013.01); *G05B 19/0428* (2013.01); *H04L 12/2816* (2013.01); *H05B 47/115* (2020.01); *H05B 47/19* (2020.01)

(58) Field of Classification Search
CPC ........ G05B 19/401; G05B 2219/36073; G05B 15/02; G05B 19/0428; H05B 47/11; H05B 47/19; H05B 47/115; Y02B 20/46; H04L 12/2816
See application file for complete search history.

(56) References Cited

U.S. PATENT DOCUMENTS 6,247,085 B1 * 6/2001 Youngers .............. G06F 1/1601
                                                      710/2
6,483,428 B1 * 11/2002 Fish .................... B60R 11/0264
                                                      340/425.5

(Continued)

FOREIGN PATENT DOCUMENTS

WO     20090131985 A2    10/2009

OTHER PUBLICATIONS

European Search Report, issued in European Patent Application No. 18200226.1, dated Jan. 7, 2019, pp. 2.

(Continued)

*Primary Examiner* — Kidest Bahta
(74) *Attorney, Agent, or Firm* — Locke Lord LLP

(57) ABSTRACT

Systems and methods for automated management of buildings and rooms employ a common set of components that may be paired together to form a modular room control interface. The components may comprise a base plate and a front plate that are in data communication with each other when connected together. The base plate may include one set of room monitoring and control functions and the front plate may include a different set of room monitoring and control functions. Different combinations of base plates and front plates may then be paired together to achieve a desired functionality in the modular room control interface. Such an arrangement provides a room control interface that can be quickly and easily configured for any number of different room monitoring and control functions as needed.

20 Claims, 8 Drawing Sheets

(56) References Cited

U.S. PATENT DOCUMENTS

| | | | |
|---|---|---|---|
| 2004/0140998 A1* | 7/2004 | Gravina | H04N 21/42204 |
| | | | 715/716 |
| 2005/0047778 A1* | 3/2005 | Levinson | H04B 10/40 |
| | | | 398/9 |
| 2008/0027587 A1* | 1/2008 | Nickerson | A01G 25/16 |
| | | | 700/284 |
| 2009/0271042 A1* | 10/2009 | Voysey | G05B 19/401 |
| | | | 700/275 |
| 2013/0123991 A1* | 5/2013 | Richmond | G05D 23/1902 |
| | | | 700/276 |
| 2017/0146260 A1 | 5/2017 | Ribbich et al. | |
| 2017/0183967 A1 | 6/2017 | Masse et al. | |

OTHER PUBLICATIONS

European Search Report, issued in European Patent Application No. 18200226.1, dated Jun. 11, 2021, pages 6.

* cited by examiner

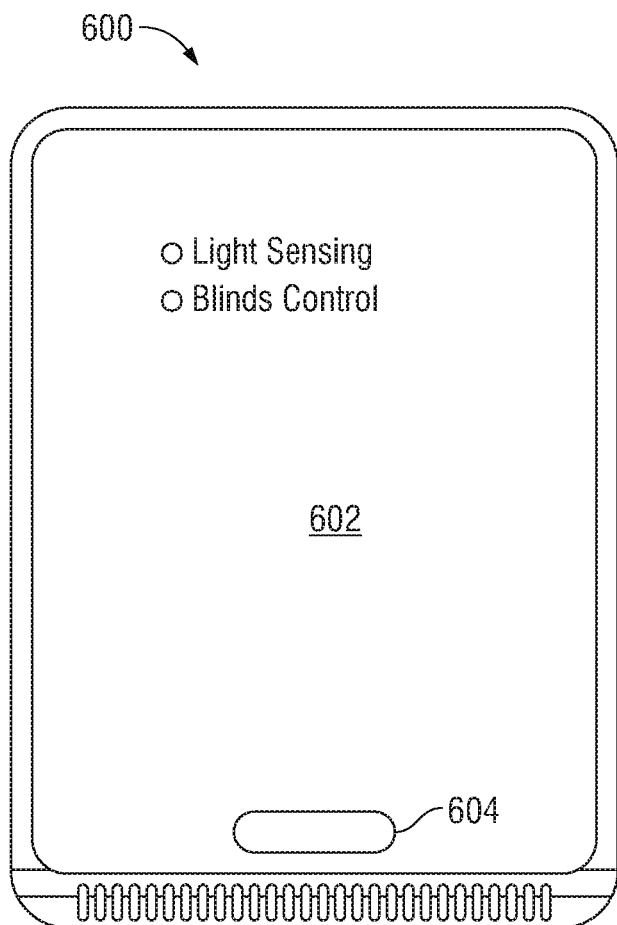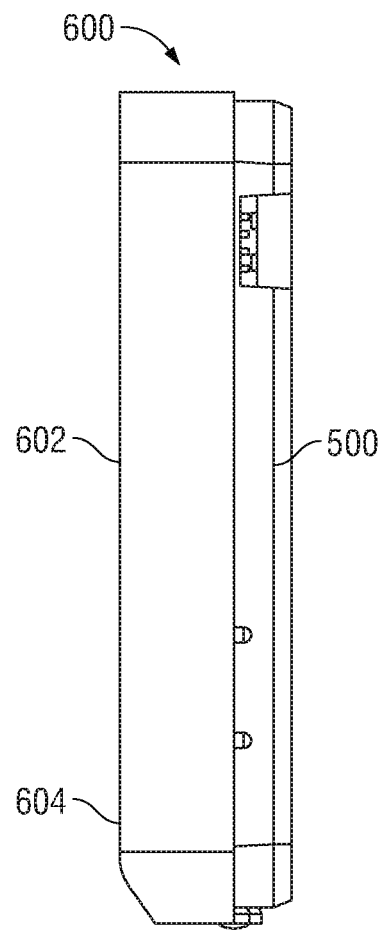
FIG. 6A      FIG. 6B

//MODULAR ROOM CONTROL INTERFACE AND SENSORS

FIELD OF THE INVENTION

The disclosed embodiments relate generally to automated management of buildings and rooms, and particularly to automated management of buildings and rooms using a modular room control interface that can be configured as needed to provide any number of room monitoring and control functions.

BACKGROUND OF THE INVENTION

Building management systems are available that can provide automated monitoring and control of room temperature, humidity, carbon dioxide ($CO_2$), occupancy, physical security, fire safety, and the like. These building management systems typically include several control subsystems that are responsible for providing one of the monitoring and control functions. For example, an HVAC control subsystem may provide monitoring and control of HVAC functions while a lighting control subsystem may provide monitoring and control of room lighting functions, and so forth.

Each control subsystem is typically connected to one or more room interface units installed around the room or controlled space being monitored. The room interface units provide the control subsystem with information about the room and may also allow the control subsystem to remotely adjust certain aspects of the room, such as temperature, lighting, and the like. The type of room interface units installed depends on the type of control subsystem that is using the interface units and the type of monitoring and control function being provided by the control subsystem. For example, an HVAC control subsystem may employ sensors that measure room temperature, humidity, $CO_2$, occupancy, and the like.

A drawback of existing room interface units is they tend to be limited to singular functions, such as temperature measurement or occupancy detection. More advanced models may integrate several functions into one unit, such as room temperature, humidity, and $CO_2$ measurements, and may provide a level of user control for these parameters. However, even advanced models are limited in that their functionality is typically fixed to the specific set of functions already on board each unit. These units have to be removed and replaced with different models if additional and/or alternative room control functions are required. As a result, multiple different models with different functionality have to be maintained to be able to accommodate new or customized room control applications.

Accordingly, a need exists for a room control interface that can be quickly and easily configured to add and replace any number of different room monitoring and control functions as needed.

SUMMARY OF THE DISCLOSED EMBODIMENTS

The embodiments disclosed herein are directed to improved systems and methods for automated management of buildings and rooms. The disclosed systems and methods employ a common set of components that may be paired together to form a modular room control interface. In some embodiments, the components may comprise a base component or base plate and a face component or front plate that may be removably attached to the base plate. When connected together, the two components operate in conjunction with one another and are in data communication with each other. The base plate includes power and communication connections, one or more sensors, logic and data processing, and the like. The front plate likewise includes logic and data processing, an interface to the base plate, one or more user interfaces that allow local interactions with users, and may also contain additional sensors. Different combinations of base plates and front plates may then be paired together to achieve a desired functionality in the modular room control interface. Such an arrangement provides a room control interface that can be quickly and easily configured for any number of different room monitoring and control functions as needed.

The particular combination of base plate and front plate determines the particular set of room monitoring and control functions and user interfaces available in the modular room control interface, either temporarily (plug-in) or long-term (integrated). Examples of functions may include measurements of temperature, humidity, $CO_2$, occupancy, light levels, IR (infrared) or radiated heat, and the like. Examples of user interfaces may include touch pad, touch buttons, simple display, touch display, speaker, microphone, wired/wireless communications, and the like.

In some embodiments, the front plate may be replaced with special function modules that allow the modular room control interface to interact with a main building control system, for example, to facilitate system initialization and commissioning, programming, and also for diagnostic purposes.

The above arrangement allows much greater function granularity to be achieved with fewer parts compared to existing solutions. Additional benefits include the ability to fine-tune monitoring and control functions for a given room or controlled space, quick and easy replacement of units due to failure as only the failed component need to be replaced, and quick and easy upgrade or downgrade of functionality. Other benefits include plug-and-play capability for facilitating installation, commissioning, and diagnostic of new systems as well as common firmware that is able to recognize and execute different combinations of onboard functions. The disclosed modular room control interface can also expedite introduction of new hardware, including future or yet-to-be-developed sensors and user interfaces.

In general, in one aspect, the disclosed embodiments are directed to a method for configuring a modular room control interface. The method comprises detecting, at a base component of the modular room control interface, a room control function of an interchangeable component of the modular room control interface, the interchangeable component being removably coupled to the base component, the base component including at least one room control function other than the room control function of the interchangeable component. The method further comprises updating, at the base component, the at least one room control function of the base component to include the room control function of the interchangeable component, and controlling, at the base component, at least one control function of a room using the updated at least one room control function of the base component.

In general, in another aspect, the disclosed embodiments are directed to a room control interface. The room control interface comprises a base component having a base room control function, and a face component removably attached to the base component, the face component having a user interface and/or a room control function that is different from the base room control function. The face component is selected from one of a first face component including a first user interface and/or a first room control function and a second face component that is interchangeable with the first face component, the second face component including a second user interface and/or a second room control function that is different from the first user interface and/or the first room control function, respectively.

In general, in still another aspect, the disclosed embodiments are directed to a building management system. The building management system comprises at least one control subsystem, at least one local controller connected to the at least one control subsystem, and a plurality of modular room control interfaces connected to the at least one local controller. Each modular room control interface comprises a base plate having a base room control function and a face plate removably attached to the base plate, the face plate having a user interface and/or a room control function that is different from the base room control function. The face plate is selected from one of a first face plate including a first user interface and/or a first room control function and a second face plate that is interchangeable with the first face plate, the second face plate including a second user interface and/or a second room control function that is different from the first user interface and/or the first room control function, respectively.

BRIEF DESCRIPTION OF THE DRAWINGS

The foregoing and other advantages of the disclosed embodiments will become apparent upon reading the following detailed description and upon reference to the drawings, wherein:

FIGS. 6A and 6B illustrate an exemplary front plate for the modular room control interface according to the disclosed embodiments;

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

At a high level, the embodiments disclosed herein relate to improved systems and methods for automated management of buildings and rooms. These systems and methods provide a common set of components that may be paired together to form a modular room control interface. The particular pairing of components determines the particular set of room monitoring and control functions and user interfaces available in the modular room control interface. This allows the modular room control interface to be quickly and easily configured to provide almost any desired set of room monitoring and control functions and user interfaces.

Figure 1:
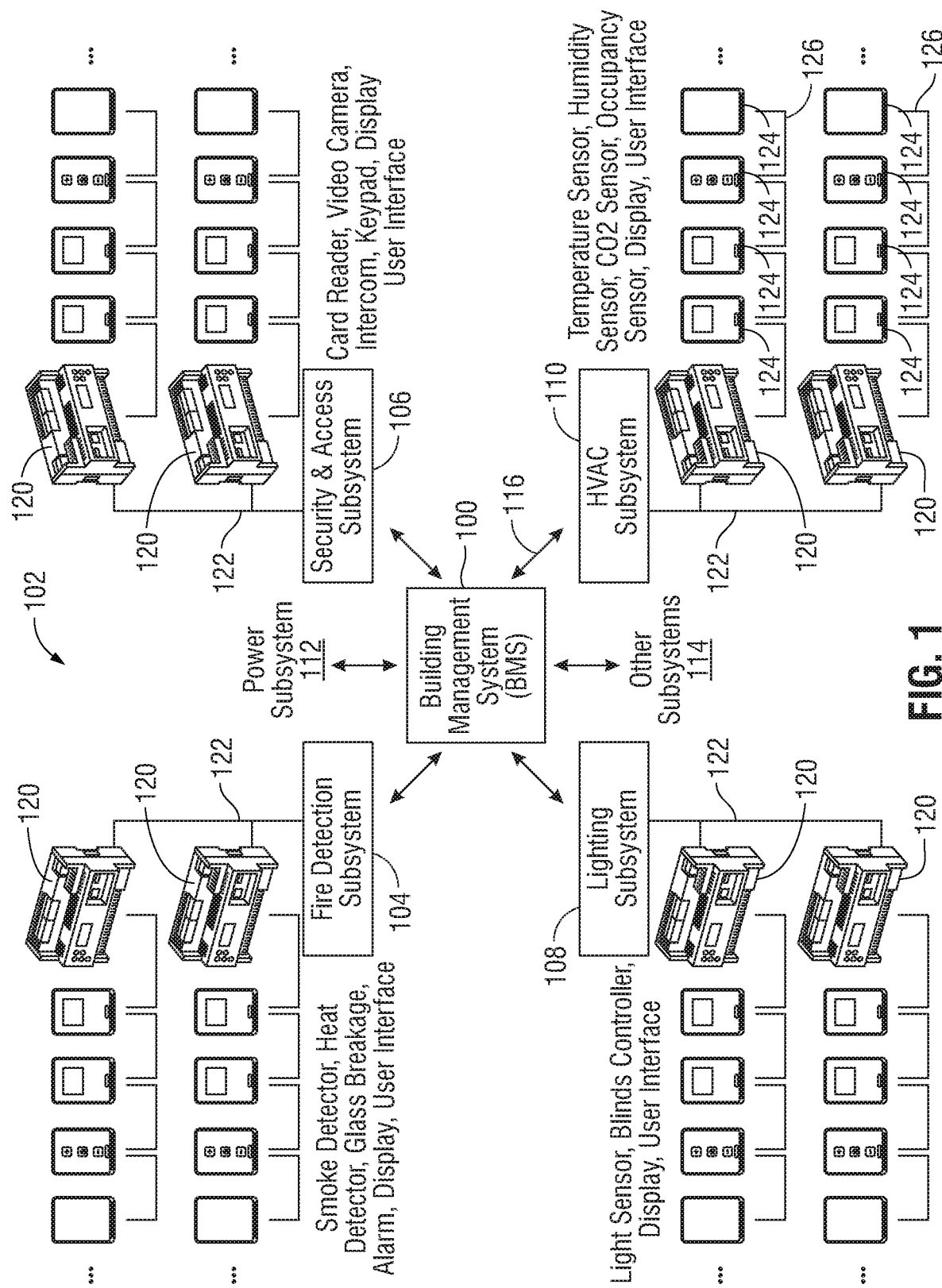
FIG. 1 illustrates an exemplary building management system employing modular room control interfaces according to the disclosed embodiments.

Referring now to FIG. 1, an exemplary building management system (BMS) 100 is shown that employs modular room control interfaces according to the disclosed embodiments. The building management system 100 may be a typical computer-based BMS system known to those skilled in the art that is installed in a building, indicated generally at 102, to maintain the internal environment of the building. Such a building management system 100 operates to monitor and control the mechanical and electrical equipment in the building 102, including ventilation, lighting, power, fire alarm, security, and the like. An example of a BMS that may be used as the building management system 100 is any one of the EcoStruxure™ line of building solutions available from Schneider Electric Co.

As FIG. 1 shows, the building management system 100 is connected to a number of building control subsystems that control specific aspects of the building 102. For example, there may be a fire detection subsystem 104, a security and access subsystem 106, a lighting subsystem 108, an HVAC subsystem 110, a power subsystem 112, as well as other subsystems 114 known to those skilled in the art. In general, the fire detection subsystem 104 is responsible for detecting fires and taking the appropriate actions to alert occupants and expedite evacuation. The security and access subsystem 106 is responsible for controlling physical access to the building 102, including restricting entry into secured rooms and other controlled spaces. The lighting subsystem 108 is responsible for providing appropriate levels of lighting based on occupancy or as otherwise programmed. The HVAC subsystem 110 is responsible for controlling the climate in the rooms and other controlled spaces in the building 102. And the power subsystem 112 is responsible for monitoring the amount of power being used by the various systems and equipment throughout the building 102. These subsystems 104-114 communicate with the building management system 100 over a respective building communication link 116, which may include wired and/or wireless links.

Each control subsystem 104-114 is in turn connected to one or more local controllers or nodes 120 over a local communication link 122, which may also include wired and/or wireless links. The local controllers or nodes 120 provide local control of and facilitate communication and connectivity between the control subsystems 104-114 and one or more modular room control interfaces 124 connected to each local controller or nodes 120. Examples of suitable devices that may be used as the local controllers or nodes 120 include the SmartStruxure™ server device from Schneider Electric Co.

The modular room control interfaces 124 provide room monitoring and control functions and user interfaces for the various control subsystems 104-114. For example, the modular room control interfaces 124 for the fire detection subsystem 104 may provide smoke detection, heat detection, glass breakage detection, alarm, display, user interface, and the like. For the security and access subsystem 106, a card reader, video camera, intercom, keypad, display, user interface, and the like may be provided. For the lighting subsystem 108, a light sensor, blinds controller, display, user interface, and the like may be provided. And for the HVAC subsystem 110, a temperature sensor, humidity sensor, CO2 sensor, occupancy sensor, display, user interface, and the like may be provided by the modular room control interfaces 124. Only the modular room control interfaces 124 for the HVAC subsystem 110 are specifically enumerated in FIG. 1.

Figure 2:
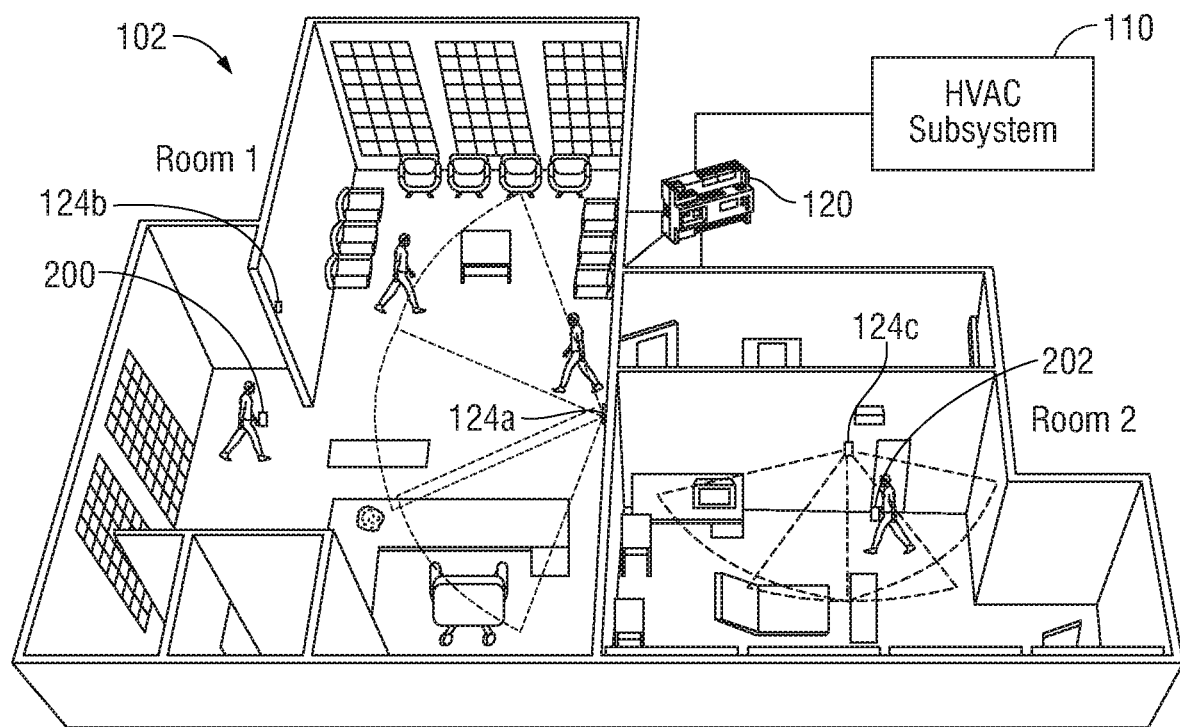
FIG. 2 illustrates exemplary installations of the modular room control interfaces within a building.

FIG. 2 is a partial cutaway view of the building 102 showing exemplary installations of modular room control interfaces 124 within the building 102. In this example, Room 1 is a main reception area and has a first modular room control interface 124a installed on one wall and a second modular room control interface 124b installed on an opposite wall. The two modular room control interfaces 124a-b are essentially identical except that first modular room control interface 124a provides temperature and occupancy sensing and a touchscreen display for accepting manual user settings, while the second modular room control interface 124b provides light sensing, blinds control, and a touchscreen display for accepting manual user control. A user may then access and interact with these modular room control interfaces 124a-b using a touchscreen display or using a monitoring and control app running on a smart phone, tablet, or other smart device 200.

Room 2 in this example is an interior office and has a third modular room control interface 124c installed on one wall. The third modular room control interface 124c is essentially identical to the first modular room control interface 124a except that it provides a tactile user interface (e.g., buttons) instead of a touchscreen display by virtue of having a different front plate, as explained further below. A user may then access and interact with the third modular room control interface 124c using its tactile interface or using a monitoring and control app running on a smart phone, tablet, or other smart device 202. Additional modular room control interfaces 124 having the same or different room monitoring and control functions and user interfaces may of course be installed in the building 102 as needed.

Figure 3:
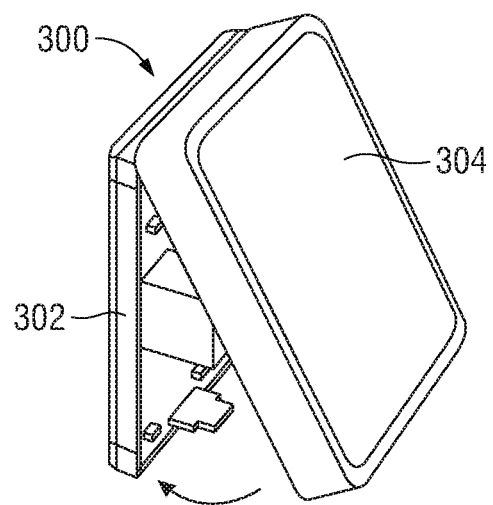
FIG. 3 illustrates an exemplary modular room control interface according to the disclosed embodiments.

An exemplary implementation of a modular room control interface according to the disclosed embodiments is shown in FIG. 3 at 300. In this implementation, the modular room control interface 300 comprises two main components, a base component or base plate 302 and a face component or front plate 304 that may be removably attached to the base plate 302. In general, the base plate 302 provides a basic set of room monitoring and control functions, such as temperature, humidity, and CO2 sensing, while the front plate 304 may provide a different set of room monitoring and control functions. The front plate 304 may also provide one or more user interfaces, such as manual tactile controls, an audio user interface, a wireless user interface, and the like. Several types of displays may also be provided through the front plate 304 according to desired functionality and budget. These two components 302 and 304 may then be paired together to achieve a wide variety of monitoring and control functions and user interfaces.

In accordance with the disclosed embodiments, the base plate 302 shares the same system architecture as other base plates, and the front plate 304 shares the same system architecture as other front plates. The common system architectures allow the base plate 302 and the front plate 304 to be interchangeable with other base plates and front plates, respectively. Such modularity means any front plate 304 may be connected to a base plate 302, and vice versa, regardless of the specific functions provided by each plate. Different base plates 302 may then be paired with different front plates 304 to create a customized or new set of room monitoring and control functions and user interfaces. A dynamic model numbering scheme may then be used for the room control interface 300 in which the model numbers are changed or updated internally based on the combined functionality of the two components 302 and 304. In this way, more granular functionality may be achieved using few components by providing users with several base plates 302 that each may be paired with several front plates 304.

The modularity of the room control interface 300 also lends itself to introducing new functions in the future, whether a new display functionality, a new type of sensor, a new standard of wireless communication, or the like. This may be accomplished while the base plate 302 remains in place with only the front plate 304 being replaced. Once a new front plate 304 is properly paired to the base plate 302, the base plate 302 may send a signal or otherwise communicate with the appropriate local controller or node 120 (see FIG. 1) notifying it of the new front plate 304 and the additional/alternative functions provided therein. The local controller or node 120 may then notify the appropriate control subsystems 104-114, which may likewise notify the building management system 100, of the change in functionality. Upgradeable and adaptable firmware may be downloaded from the building management system 100 to the modular room control interface 300 as needed to support the additional or new functions and hardware components on the replacement front plate 304, as well as to update the internal dynamic model number of the room control interface 300. Such firmware may be used to detect and determine the presence of various hardware components and enable various functions accordingly.

In some embodiments, custom models may be used in which the front plate 304 is temporarily replaced with a different front plate for communicating directly to the building management system 100 or one of the control subsystems 104-114. This allows the modular room control interface 300 to interact with other room control interfaces in other parts of the system, whether peer-to-peer devices or parent-host devices (depending on security settings and permissions). This also allows the modular room control interface 300 to access the local controller or node 120 (see FIG. 1) during operation phase or even during early project phase before the full system infrastructure is in place. Such an arrangement provides several advantages over existing solutions, including local controller and/or peer commissioning (e.g., controller setup, I/O checkout, variable air volume (VAV) air balancing, etc.), local controller and/or peer diagnostics, local controller and/or peer programming, and the like.

Figure 4:
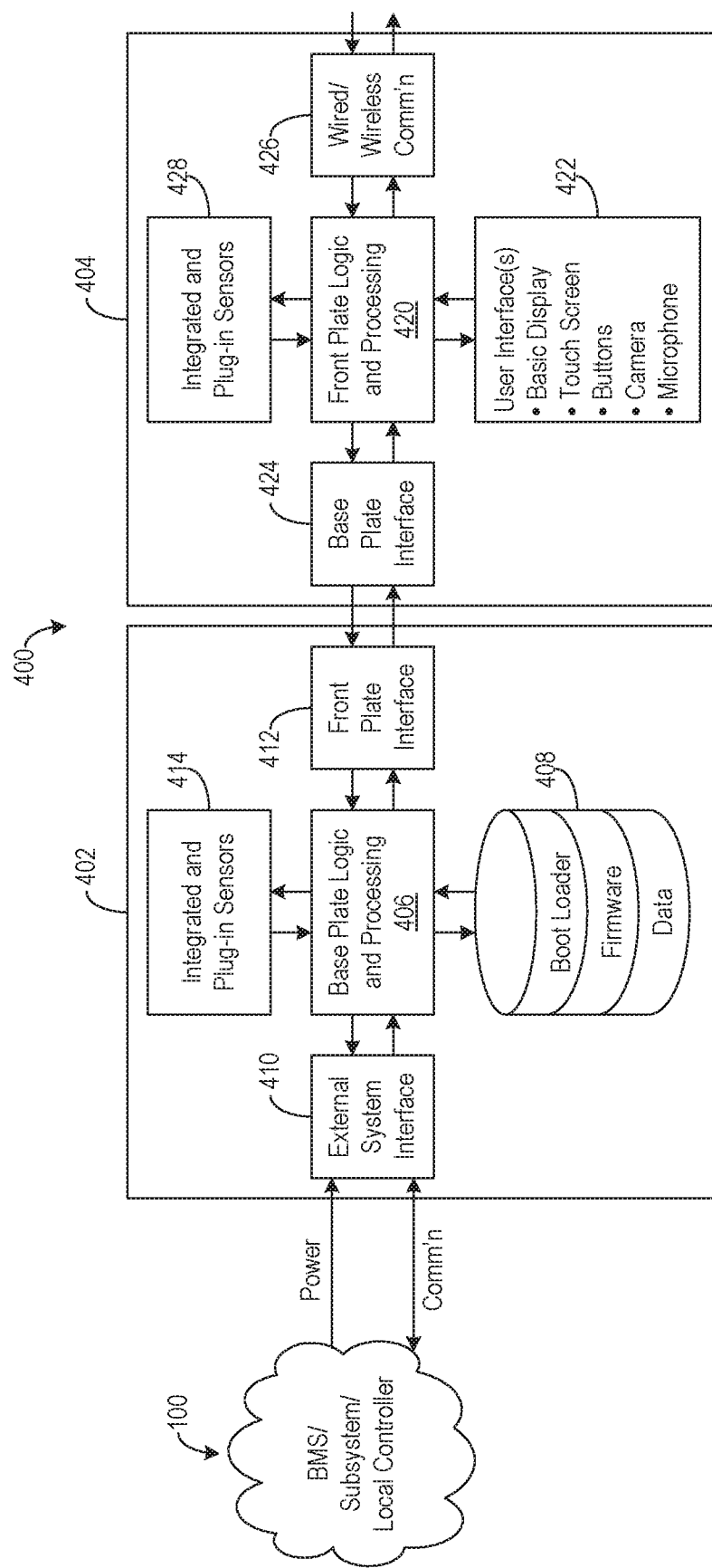
FIG. 4 illustrates an exemplary system architecture for a modular room control interface according to the disclosed embodiments.

Referring next to FIG. 4, exemplary system architectures are shown that may be used for a modular room control interface 400 having a base plate 402 and a front plate 404 according to the disclosed embodiments. The modular room control interface 400 is depicted here in block diagram form using a number of discrete blocks for easy reference. However, those skilled in the art will understand that any block may be divided into two or more constituent blocks, and any two or more blocks may be combined into a single block, without departing from the scope of the disclosed embodiments.

In the FIG. 4 example, the base plate 402 has a centralized logic and processing unit 406 that is responsible for overall operation of the base plate 402. The logic and processing unit 406 provides processing for sensor inputs (e.g., sampling, filtering, analog-to-digital conversion, etc.), issues command to the sensors as needed, manages communication between the base plate 402 and the front plate 404 as well as the local controller or node 120 (see FIG. 1), and the like. Suitable devices that may be used as the logic and processing unit 406 include, for example, the PICO line of microcontrollers from Microchip Technology or similar processing devices known to those skilled in the art.

A storage unit 408 may be connected to the base plate logic and processing unit 406 for storing any programming used by the logic and processing unit 406. For example, the storage unit 408 may store boot loader programs, firmware, and any data needed by the logic and processing unit 406, all of which may be updated from time to time as needed. Any suitable storage unit known to those skilled in the art that may be used as the storage unit 408, including volatile memory (e.g., RAM), nonvolatile memory (e.g., Flash), magnetic memory, optical memory, and the like.

An external system interface 410 and a front plate interface 412 may also be connected to the base plate logic and processing unit 406. The external system interface 410 connects the base plate 402 to the building management system 100 via one of the local controller or node 120 and control subsystems 104-114 (see FIG. 1). This allows the base plate 402 to receive power from and communicate with the one of the control subsystems when the base plate 402 is connected to one of the local controllers or nodes. The base plate 402 in turn is paired (i.e., connected physically and electrically) to the front plate 404 through the front plate interface 412. This allows the base plate 402 to provide power to and communicate with the front plate 404 when the two plates are paired with each other.

Also connected to the base plate logic and processing unit 406 are one or more sensors 414 that provide room monitoring and control functions for the base plate 402. Examples of sensors 414 that may be connected to the logic and processing unit 406 include temperature sensors, humidity sensors, CO2 sensors, occupancy sensors, light sensors, heat sensors, and the like. Some of the sensors 414 may be onboard integrated sensors while some of the sensors 414 may be plug-in sensors that may be added to the base plate 402 as needed for a particular room control application. Moreover, because the base plate 402 shares a common system architecture with other base plates, some of the sensors 414 themselves may also be modular and may be swapped out with different sensors 414 as needed for a particular room control application. The result is a standardized or universal base plate 402 in which one or more sensors 414 may be quickly and easily removed and replaced to support numerous combinations of sensors. Different base plate model numbers may then be used to indicate the particular combination of sensors in the base plate 402.

The front plate 404 has a similar system architecture as the base plate 402 insofar as there is a centralized logic and processing unit 420 that is responsible for overall operation of the front plate 404. The logic and processing unit 420 operates to process sensor inputs, issue commands to the sensors, manage communications to and from the base plate 402, and the like, in a similar manner as the base plate logic and processing unit 406. Suitable processing units that may be used as the front plate logic and processing unit 420 include the PICO microcontrollers from Microchip Technology and similar devices known to those skilled in the art.

One or more user interfaces 422 may also be connected to the front plate logic and processing unit 420 for receiving manual user selections and settings. Examples of user interfaces that may be connected to the logic and processing unit 420 include physical interfaces, such as a simple display, touchscreen display, various buttons, a camera, a microphone, and the like, as well as wired and/or wireless interfaces. Some of these user interfaces 422 are also be modular by virtue of the common system architecture that the front plate 404 shares with other front plates such that a simple display may be quickly and easily swapped out for a touchscreen display or touch buttons. The result is again a standardized or universal front plate 404 that allows one or more user interfaces 422 to be quickly and easily removed and replaced with other user interfaces 422 as needed.

A base plate interface 424 and communications interface 426 may also be connected to the front plate logic and processing unit 420. As the term suggests, the base plate interface 424 pairs (i.e., connects physically and electrically) the front plate 404 to the base plate 402. This allows the front plate logic and processing unit 420 to receive power from and communicate with the base plate 402. The front plate logic and processing unit 420 may also communicate with users through the communications interface 426. For example, the front plate logic and processing unit 420 may communicate with a mobile device of the users, such as a smartphone or tablet, through the communications interface 426. This communication may be established, for example, via Bluetooth, Wi-Fi, or other wireless connection, as well as over an Ethernet or other wired connection.

One or more sensors 428 may also be connected to the front plate logic and processing unit 420. The sensors 428 provide room monitoring and control functions for the front plate 404 and may be some of the same sensors that are used with the base plate 402. Examples may include temperature sensors, humidity sensors, CO2 sensors, occupancy sensors, light sensors, heat sensors, and the like. As with the base plate 402, some of the sensors 428 may be onboard integrated sensors while some of the sensors 428 may be plug-in sensors owing to the common system architecture that the front plate 404 shares with other front plates. Different front plate model numbers may then be used to indicate the particular combination of sensors 428 (and user interfaces 422) in the front plate 404. More detailed examples of the front plate 404 and the base plate 402 may be seen in the following figures.

Figure 5A:
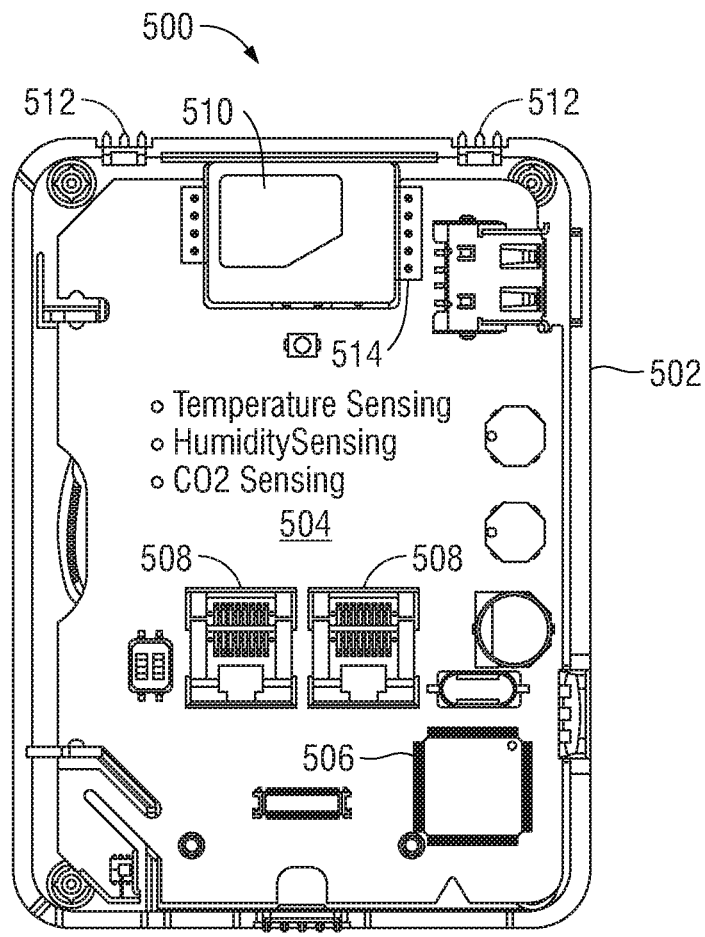
FIGS. 5A and 5B illustrate an exemplary baseplate for the modular room control interface according to the disclosed embodiments.
Figure 5B:
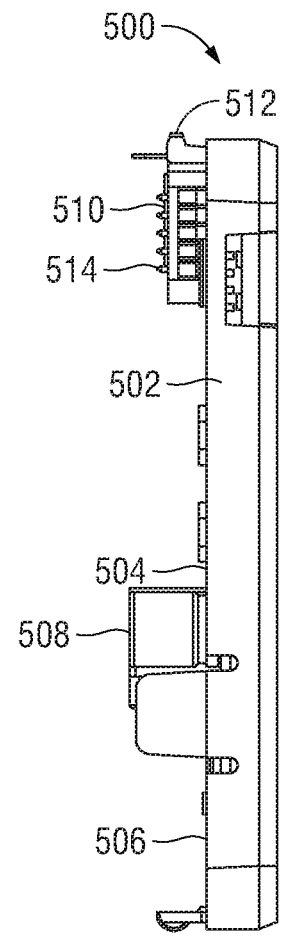

Referring to FIGS. 5A and 5B, front and side views, respectively, are shown of an exemplary base plate 500 having several room monitoring and control functions, including temperature sensing, humidity sensing, and CO2 sensing, and the like. The exemplary base plate 500 comprises a generally rectangular base plate housing 502 having a circuit board 504 installed therein on which a number of discrete and integrated circuit components are mounted. Only certain components are visible in this example, including a logic and processing unit 506, a pair of external interfaces 508, and a CO2 sensor 510. In some embodiments, the CO2 sensor 510 may be a plug-in sensor that may be removed and swapped out with, for example, a nitrogen sensor or an oxygen sensor. The external interfaces 508 may be in the form of Ethernet connections in some embodiments that allow one of the local controllers or nodes 120 (see FIG. 1) to detect the presence of the base plate 500. A pair of mechanical interfaces 512, which may be latch mechanisms in some embodiments, allow the base plate 500 to be physically connected to a front plate (not expressly shown). Similarly, a set of electrical contacts 514, which may be pin contacts in some embodiments, allow the base plate 500 to be electrically connected to the front plate. These interfaces 512 and 514 make it easy for one front plate having one set of functions and user interfaces to be quickly removed from the base plate 500 and swapped out for another front plate having a different set of functions and user interfaces.

FIGS. 6A and 6B illustrate front and side views of an exemplary front plate 600 that can provide several additional functions, including light sensing, blinds control, and the like. The particular front plate 600 shown here has a generally rectangular cover 602 that that fits over the base plate 500 when the two are paired together. The rectangular cover 602 in this example is blank as there are no user interfaces, but those skilled in the art will understand that other, non-blank covers may be used. A release button 604 is disposed in the cover 602 to allow the front plate 600 to be removed from the base plate 500 when depressed.

Figure 7:
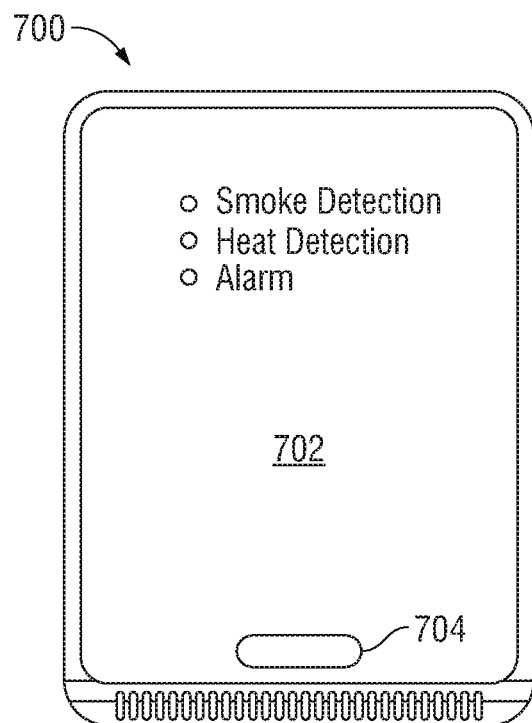
FIGS. 7-10 illustrate additional exemplary front plates for the modular room control interface according to the disclosed embodiments.

FIG. 7 shows an alternative front plate 700 that may be paired with the base plate 500 of FIG. 5 (or other base plates). The front plate 700 comprises the same generally rectangular cover 702 as the front plate 600 of FIG. 6 and is otherwise interchangeable with the front plate 600 of FIG. 6. The main difference is the front plate 700 provides smoke detection, heat detection, an alarm, and the like, whereas the front plate 600 provides light sensing, blinds control, and the like. A release button 704 allows the front plate 700 to be removed from the base plate 500 when depressed.

Figure 8:
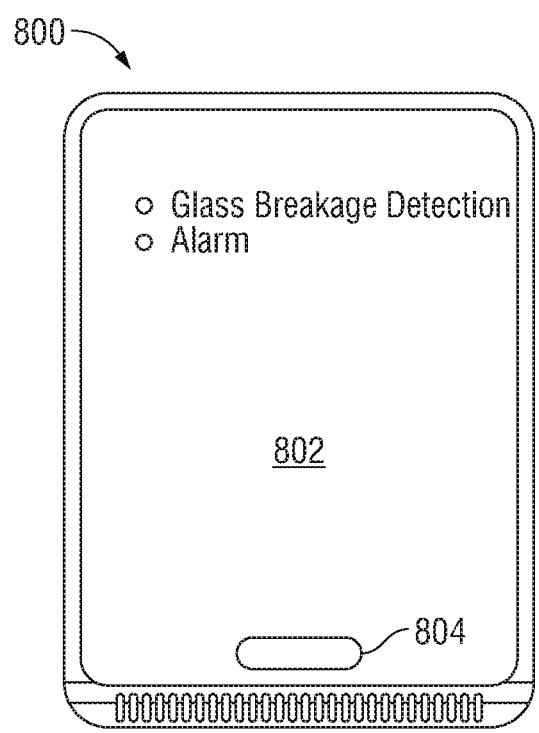

FIG. 8 shows another otherwise interchangeable front plate 800 that may be paired with the base plate 500 of FIG. 5 (or other base plates). As can be seen, the front plate 800 also comprises the same generally rectangular cover 802 as the previous front plates. However, the front plate 800 provides glass breakage detection, an alarm, and the like instead of light sensing, blinds control, smoke detection, or heat detection. A release button 804 once again allows the front plate 800 to be removed from the base plate 500 when depressed.

Figure 9:
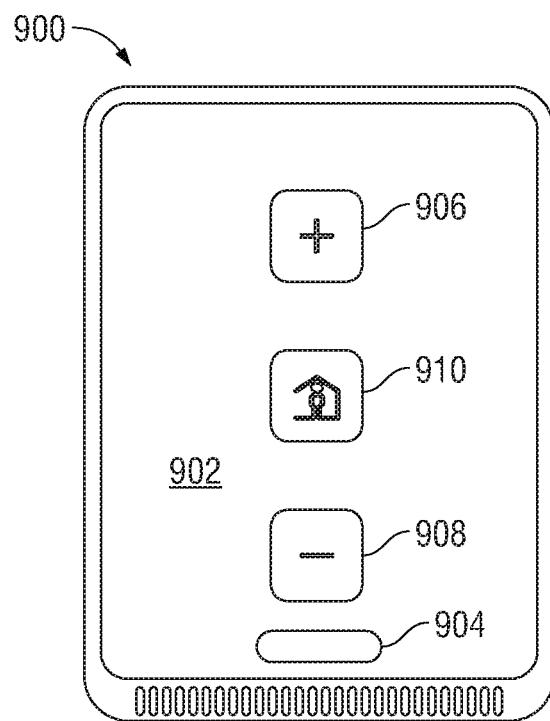

FIG. 9 shows yet another otherwise interchangeable front plate 900 that may be paired with the base plate 500 of FIG. 5 (or other base plates). In this example, no additional functions are provided by the front plate 900. Instead, the front plate 900 includes a generally rectangular cover 902 that has a 3-button user interface for allowing users to manually control room temperature. The three buttons include a temperature increase button 906, a temperature decrease button 908, and an override button 910. The override button 910 allows users to override current temperature settings and cool or heat the room for a particular amount of time depending on whether the room is currently being cooled or heated. A release button 904 again allows the front plate 900 to be removed from the base plate 500 when depressed.

Figure 10:
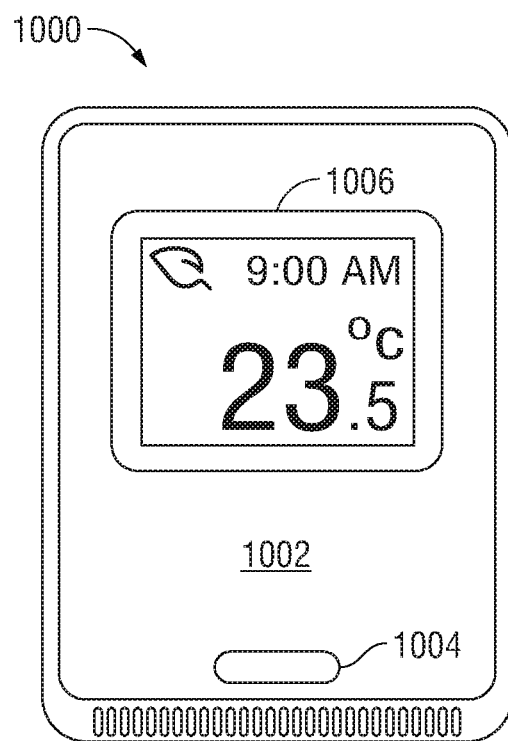

FIG. 10 shows still another otherwise interchangeable front plate 1000 that may be paired with the base plate 500 of FIG. 5 (or other base plates). Like the previous example, no additional functions are provided by the front plate 1000. Instead, the front plate 1000 includes a generally rectangular cover 1002 that has a display 1006 disposed therein. The display 1006 may be a simple display that shows basic information, such as current temperature, current time, and operating mode (i.e., energy saving mode), or it may be a touchscreen display that allows users to manually set the temperature and other aspects of the room by touching the appropriate control icons (not expressly shown). A release button 1004 once again allows the front plate 1000 to be removed from the base plate 500 when depressed.

In addition to the above examples, in some embodiments, the front plate may be replaced with special function modules (not expressly shown) that allow the modular room control interface to interact with the building management system 100 (see FIG. 1), for example, to facilitate system initialization and commissioning, programming, and also for diagnostic purposes.

Figure 11:
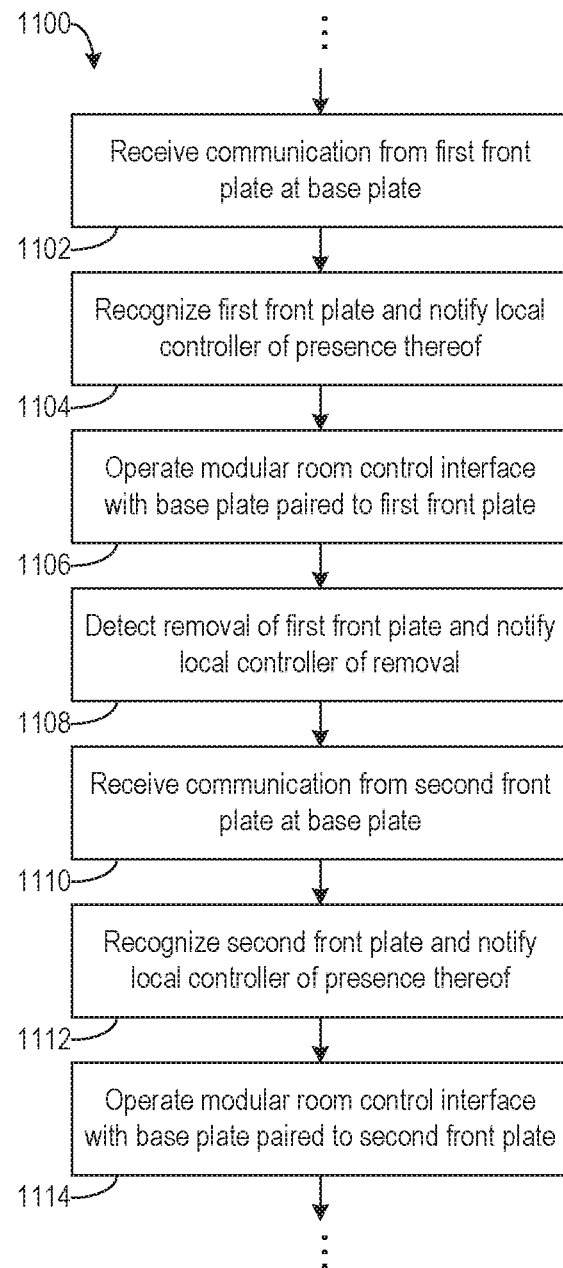
FIG. 11 illustrates an exemplary method of using a modular room control interface according to the disclosed embodiments.

Thus far, a number of specific implementations of a modular room control interface have been described. Following now in FIG. 11 is flow chart 1100, or portion thereof, outlining a method that may be used to operate the modular room control interface described herein. Those having ordinary skill in the art will understand of course that alternative arrangements may be derived from the teachings presented herein without departing from the scope of the disclosed embodiments.

As can be seen in FIG. 11, the flow chart 1100, or portion thereof, begins at block 1102 where a base plate receives a communication from a first front plate that is being paired with or otherwise connected to the base plate. At block 1104, the base plate recognizes the first front plate, either by detecting a model number of the first front plate or by detecting the monitoring and control functions (if any) and user interfaces (if any) provided by the first front plate. For example, the base plate may detect that the first front plate includes temperature sensing, humidity sensing, CO2 sensing, and the like, and one or more physical user interfaces and/or a wireless interface. The base plate thereafter updates its data to reflect the presence of the first front plate and include the monitoring and control functions and user interfaces provided by the first front plate, and notifies the appropriate local controller or node of the presence of the first front plate. At block 1106, the base plate operates while paired with the first front plate.

The flow chart 1100 continues at block 1108, where base plate detects removal of the first front plate as it is unpaired or otherwise disconnected from the base plate. The first front plate may need to be removed, for example, because additional or alternative functions or a different user interface may be needed for the modular room control interface. Thereafter, the base plate receives a communication from a second front plate being paired with or otherwise connected to the base plate at block 1110. At block 1112, the base plate recognizes the second front plate, either by detecting a model number of the second front plate or by detecting the monitoring and control functions and user interfaces provided by the second front plate. The base plate thereafter updates its data to reflect the presence of the second front plate and include the monitoring and control functions and user interfaces provided by the first front plate, and notifies the appropriate local controller or node of the presence of the second front plate. The base plate then operates while paired with the second front plate at block 1114. Note that the second front plate is otherwise interchangeable with the first front plate and may therefore be paired with the base plate without removing or uninstalling the base plate.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A method for configuring a modular room control interface, the method comprising:
   detecting, at a base component of the modular room control interface, a room control function of an interchangeable face component of the modular room control interface, the interchangeable face component being removably coupled to the base component, the base component including at least one room control function;
   updating, at the base component, the at least one room control function of the base component to include the room control function of the interchangeable face component; and
   controlling, at the base component, at least one control function of a room using the updated at least one room control function of the base component.

2. The method of claim 1, further comprising the base component notifying a local controller to which several base components are connected of a presence of the interchangeable face component.

3. The method of claim 1, wherein the at least one room control function of the base component and the room control function of the interchangeable face component are selected from the following room control functions: smoke detection, heat detection, glass breakage detection, alarm, card reader, light sensing, blinds control, temperature sensing, humidity sensing, CO2 sensing, and occupancy sensing.

4. The method of claim 1, wherein the at least one room control function of the base component and the room control function of the interchangeable face component are integrated onboard the base component and the interchangeable face component, respectively, or plugged in to the base component and the interchangeable face component, respectively.

5. The method of claim 1, wherein the interchangeable face component includes a user interface selected from the following: a touch pad, touch buttons, simple display, touch display, speaker, microphone, and wireless communication link.

6. The method of claim 5, wherein the wireless communication link uses one of a Wi Fi wireless communication protocol or a Bluetooth wireless communication protocol.

7. A room control interface, comprising:
   a base component having a base room control function; and
   a face component removably attached to the base component, the face component having a user interface and/or a room control function that is different from the base room control function;
   wherein the face component is selected from one of a first face component including a first user interface and/or a first room control function and a second face component that is interchangeable with the first face component, the second face component including a second user interface and/or a second room control function that is different from the first user interface and/or the first room control function, respectively.

8. The room control interface of claim 7, wherein the base component is configured to detect a presence of the first face component or the second face component and notify a local controller to which several base components are connected of the presence of the first face component or the second face component.

9. The room control interface of claim 7, wherein the base room control function, the first room control function, and the second room control function are selected from the following room control functions: smoke detection, heat detection, glass breakage detection, alarm, card reader, light sensing, blinds control, temperature sensing, humidity sensing, CO2 sensing, and occupancy sensing.

10. The room control interface of claim 7, wherein the base room control function, the first room control function, and the second room control function are integrated onboard the base component, the first face component, and the second face component, respectively, or plugged in to the base component, the first face component, and the second face component, respectively.

11. The room control interface of claim 7, wherein the first user interface and the second user interface are selected from the following: a touch pad, touch buttons, simple display, touch display, speaker, microphone, and wireless communication link.

12. The room control interface of claim 11, wherein the wireless communication link uses one of a Wi Fi wireless communication protocol or a Bluetooth wireless communication protocol.

13. A building management system, comprising:
   at least one control subsystem;
   at least one local controller connected to the at least one control subsystem; and
   a plurality of modular room control interfaces connected to the at least one local controller, each modular room control interface comprising a base plate having a base room control function and a face plate removably attached to the base plate, the face plate having a user interface and/or a room control function that is different from the base room control function;
   wherein the face plate is selected from one of a first face plate including a first user interface and/or a first room control function and a second face plate that is interchangeable with the first face plate, the second face plate including a second user interface and/or a second room control function that is different from the first user interface and/or the first room control function, respectively.

14. The building management system of claim 13, wherein the at least one control subsystem includes one or more of a fire detection subsystem, a building security and access subsystem, a lighting subsystem, an HVAC subsystem, and a power subsystem.

15. The building management system of claim 13, wherein the face plate is a special function module that allows a modular room control interface to interact directly with the building management system to facilitate system initialization and commissioning, system programming, and system diagnostic.

16. The building management system of claim 13, wherein the base plate is configured to detect a presence of the first face plate or the second face plate and notify the at least one local controller of the presence of the first face plate or the second face plate.

17. The building management system of claim 13, wherein the base room control function, the first room control function, and the second room control function are selected from the following room control functions: smoke detection, heat detection, glass breakage detection, alarm, card reader, light sensing, blinds control, temperature sensing, humidity sensing, CO2 sensing, and occupancy sensing.

18. The building management system of claim 13, wherein the base room control function, the first room control function, and the second room control function are integrated onboard the base plate, the first face plate, and the second face plate, respectively, or plugged in to the base plate, the first face plate, and the second face plate, respectively.

19. The building management system of claim 13, wherein the first user interface and the second user interface are selected from the following: a touch pad, touch buttons, simple display, touch display, speaker, microphone, and wireless communication link.

20. The building management system of claim 19, wherein the wireless communication link uses one of a Wi Fi wireless communication protocol or a Bluetooth wireless communication protocol.

* * * * *